(12) United States Patent
Kovacs

(10) Patent No.: US 10,260,383 B2
(45) Date of Patent: Apr. 16, 2019

(54) CONTROL VALVE WITH CHECK VALVE

(71) Applicant: Schaeffler Technologies AG & Co. KG, Herzogenaurach (DE)

(72) Inventor: Mihaly Kovacs, Sf. Gheorghe (RO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 38 days.

(21) Appl. No.: 15/518,627

(22) PCT Filed: Jul. 30, 2015

(86) PCT No.: PCT/DE2015/200429
§ 371 (c)(1),
(2) Date: Apr. 12, 2017

(87) PCT Pub. No.: WO2016/058600
PCT Pub. Date: Apr. 21, 2016

(65) Prior Publication Data
US 2017/0241303 A1    Aug. 24, 2017

(30) Foreign Application Priority Data

Oct. 14, 2014    (RO) .................................. 2014 00763

(51) Int. Cl.
*F01L 1/34* (2006.01)
*F01L 1/344* (2006.01)
(Continued)

(52) U.S. Cl.
CPC .............. *F01L 1/3442* (2013.01); *F01L 1/047* (2013.01); *F16K 11/0716* (2013.01);
(Continued)

(58) Field of Classification Search
CPC ......... F01L 1/047; F01L 1/344; F01L 1/3442; F01L 2001/34426; F01L 2001/34433; F16K 11/0716; F16K 15/142
(Continued)

(56) References Cited

U.S. PATENT DOCUMENTS

| 4,193,424 A | 3/1980 | Hrabal |
| 7,261,072 B2 * | 8/2007 | Schmitt ................. F01L 1/3442 123/90.15 |
| 8,757,114 B2 | 6/2014 | Hoppe et al. |

FOREIGN PATENT DOCUMENTS

| DE | 10 2009 024 026 A1 | 12/2010 |
| EP | 0174530 | 3/1986 |
| FR | 2367232 | 5/1978 |

OTHER PUBLICATIONS

International Search Report of PCT/DE2015/200429 dated Apr. 11, 2015, 2 pages.

* cited by examiner

*Primary Examiner* — Ching Chang
(74) *Attorney, Agent, or Firm* — Davidson, Davidson & Kappel, LLC

(57) ABSTRACT

A control valve for a camshaft adjuster having a valve housing (3) and having a control piston (4) which is guided axially movably in a receptacle of the valve housing (3), and having a check valve (2) which is arranged within the piston cavity (22) and consists of a spring band (23) with overlapping ends which is wound to form a cylindrical valve spring, wherein the spring band (23), at the inner end (24) thereof, merges into an axially extending spacer element (28), the axial ends (29, 30) of which may be brought into contact with the inner side of the end surfaces of the control piston (4) is provided. The spacer element (28) has a uniform
(Continued)

surface which is interrupted in an axial section of the spacer element (28) by way of an elevation (32).

10 Claims, 2 Drawing Sheets

(51) Int. Cl.
*F16K 11/07* (2006.01)
*F16K 15/14* (2006.01)
*F01L 1/047* (2006.01)

(52) U.S. Cl.
CPC ... *F16K 15/142* (2013.01); *F01L 2001/34426* (2013.01); *F01L 2001/34433* (2013.01)

(58) Field of Classification Search
USPC .............................. 123/90.12, 90.15, 90.17
See application file for complete search history.

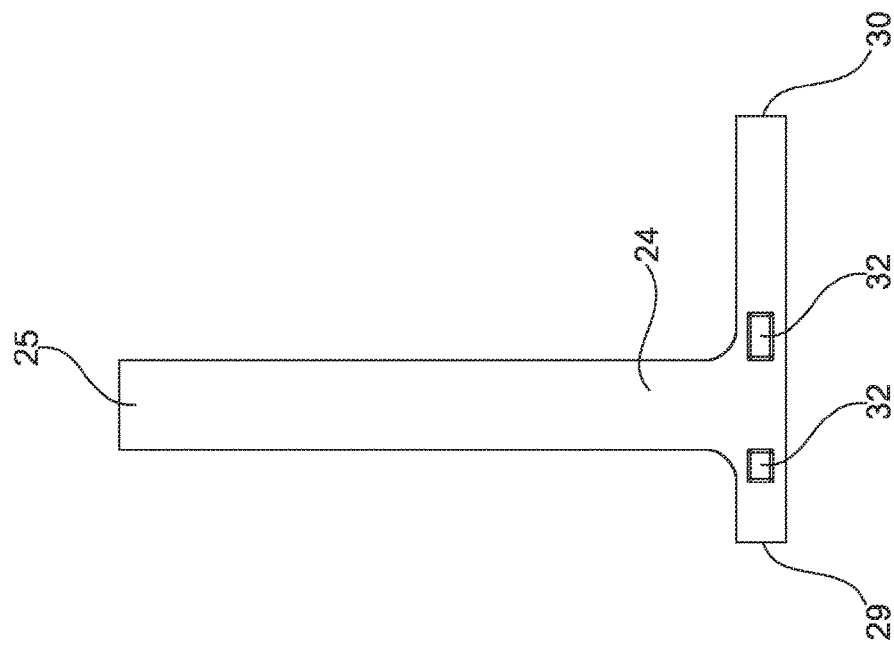
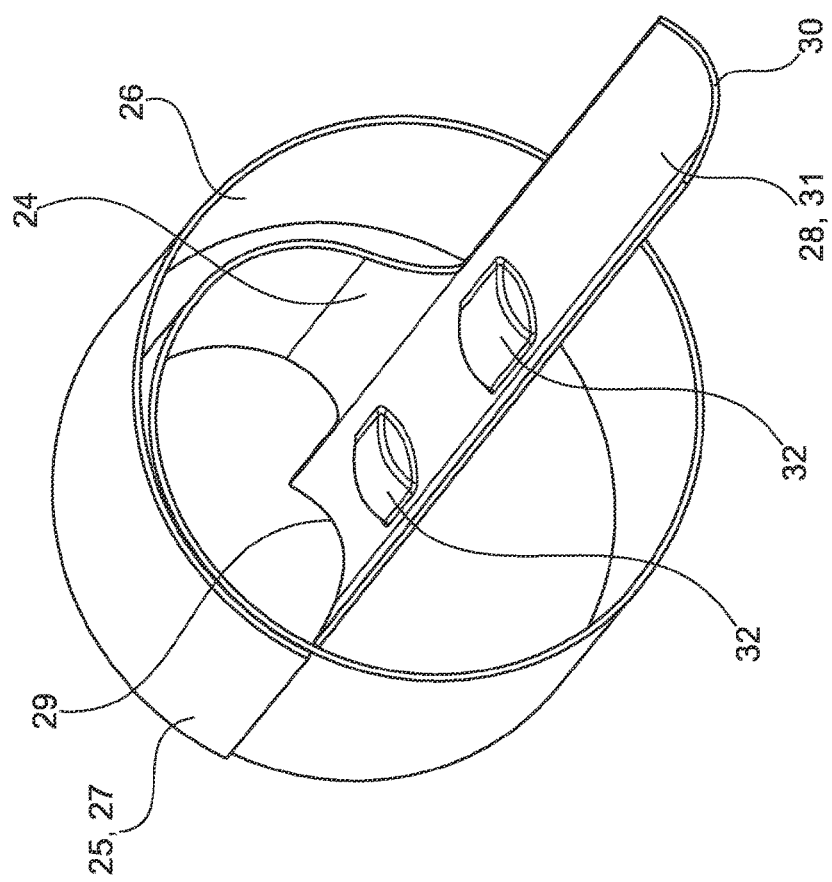

CONTROL VALVE WITH CHECK VALVE

The present invention refers to the field of proportional directional control valves which may be used as a central valve in particular for controlling so-called camshaft adjusters. Camshaft adjusters serve to control the operation of an internal combustion engine by influencing the charge cycle in a targeted manner. Adjusting the phase position of the camshaft changes the position of the latter relative to the phase position of the crankshaft; the opening and closing times of the gas exchange valves may thus be shifted to an earlier or later point in time in the cycle. Central valves have multiple switching positions, with the aid of which the course of a pressure medium path between an inflow and an outflow may be adjusted. The pressure medium flow exerts on the camshaft adjuster a force which is dependent on the switching position and which brings about an adjustment into a particular position. Pressure peaks may occur within the pressure medium paths, and the occurrence thereof may cause damage to adjacent components. The pressure medium pump may be particularly affected.

BACKGROUND

DE 10 2009 024 026 A1 describes a control valve for a camshaft adjuster, including a hollow control piston which is movably guided within a valve housing. Arranged within the piston cavity is a hydraulically unlockable check valve which opens a first pressure medium line in the inflow direction, the check valve having a closing part which has a sealing surface and by way of which the at least one valve opening is closable. The closing part is designed in the form of a spiral-wound band and is elastically deformable, as a result of which the sealing surface thereof is movable into a closed position, in which the sealing surface rests sealingly against the valve opening, and into an open position, in which the valve opening is fully open. Also located on the closing part is an integrally formed support section for the axial support of the closing part on the control piston.

SUMMARY OF THE INVENTION

It is an object of the present invention to provide a control valve including a check valve integrated into the control piston, the operation behavior of which is improved.

The present invention provides a control valve for a camshaft adjuster, including a valve housing which has an inflow opening, and including a control piston which is guided axially movably in a receptacle of the valve housing and which has a first and a second control edge which enclose a groove, whereby the groove may be connected to the inflow opening, and whereby the groove is connected via a through-opening on the groove bottom to a cylindrical piston cavity which is closed at the end, and including a check valve which is situated within the piston cavity and which is formed of a spring band with overlapping ends that is wound to form a cylindrical valve spring, as a result of which a radially inner and an outer end and also an inner and outer surface of the spring band are defined. The spring band, at the inner end thereof, merges into an axially extending spacer element, the axial ends of which may be brought into contact with the inner side of the end surfaces of the control piston, whereby the axial position of the spring band within the piston cavity is set in such a way that the outer surface of the spring band, in the area of the through-opening, may be brought to rest against the inner lateral surface of the piston and thus the through-opening may be closed. The spacer element has a uniform surface which is interrupted in an axial section of the spacer element on the inner side of the spring band by an elevation.

The check valve is formed of a spring band with overlapping ends that is wound to form a cylindrical valve spring. If two check valves are inadvertently inserted into a control piston, the operation behavior of the control valve also changes as a result of the altered response behavior. According to the finding of the present invention, check valves according to the present invention tend to get stuck prior to installation. If two check valves are lying congruently upon one another, the two may inadvertently be installed within the piston cavity. The present invention improves the operation behavior of the control valve by preventing two check valves from lying congruently upon one another. The spacer element has a uniform surface which is interrupted in an axial section of the spacer element on the inner side of the spring band by an elevation. The present invention thus makes it more difficult for two check valves to get stuck. In addition, elements which have already been pushed into each other prior to installation are made visible.

Control valves according to the present invention are preferably designed as central valves which are accommodated in a cavity of a camshaft. Such central valves usually have two supply connections which supply pressure medium to adjacent elements—such as for example a camshaft adjuster. Central valves usually have a pressure medium supply and a pressure medium discharge. The axial position of the control piston establishes the course of the pressure medium paths; each switching position is linked to a particular switching logic between the at least four connections. The axial position of the control piston is usually controlled with the aid of an electromagnetic actuator. In the claimed invention, the piston cavity forms part of the pressure medium supply and of the pressure medium distributing chamber.

In one advantageous specific embodiment, the uniform surface of the spacer element is interrupted on two spaced-apart axial sections of the spacer element on the inner side of the spring band by an elevation in such a way that any threading-together of two spring bands wound to form a cylindrical valve spring prior to the insertion thereof into the valve piston is prevented. Advantageously, due to the proposed design, two check valves are prevented from being pushed into each other. The ends of the spacer element butt against one of the elevations, thereby preventing any joining of two check valves. In addition, elements which have already been pushed into each other prior to installation are made particularly visible.

In one advantageous specific embodiment, the spacer element is formed by a tongue-like channel. In one refinement, this tongue-like channel has a curved profile in cross-section. The claimed specific embodiment enables a particularly inexpensive manufacture of the check valve formed of a spring band with overlapping ends that is wound to form a cylindrical valve spring. In particular, the elevations may be optimally created from a curved profile.

In one advantageous refinement of the control valve, the two spaced-apart axial sections join the axial area in which the spring band forms the cylindrical valve spring. The proposed arrangement of the elevations is particularly effective at making it more difficult for two check valves to become threaded together or pushed into each other.

In another advantageous refinement, the elevations are formed of an exposed material section. The proposed design enables an advantageous manufacture of the elevations because an exposed material section may be formed from the existing material with little effort.

In another advantageous refinement, the spacer element extends along the axis of rotation of the spring band that is wound to form a cylindrical valve spring. The proposed design prevents two check valves from being inserted one after the other because the check valve inserted last butts against the previously inserted check valve—regardless of their relative orientation to one another.

In one advantageous embodiment, the through-opening forms a first through-opening which enables the inflow of pressure medium into the piston cavity, a second through-opening which enables the outflow of pressure medium from the piston cavity being located at the end of the control piston situated opposite the first through-opening. This embodiment includes a control piston, the piston cavity of which forms part of the pressure medium supply and pressure medium distribution. In one refinement, the end sides of the control piston are then also closed, at least one being closed by a pressed-in closure element. The inner sides of the end sides thus do not only form a stop surface for the spacer element; they also serve for closing the pressure chamber within the piston cavity.

Another object of the present invention is to provide a camshaft adjusting device formed of a camshaft adjuster and a control valve including a check valve integrated into the control piston, the operation behavior of which is improved.

The achievement of the object results from the characterizing features of the other independent claim 10. The object is thus achieved by a camshaft adjusting device including a camshaft adjuster and a control valve according to one of the aforementioned specific embodiments, whereby the control valve may be arranged as a central valve in a receptacle of a camshaft and has an inflow and an outflow connection and also two supply connections, and whereby the two supply connections may each be fluidically connected to a pressure chamber of the camshaft adjuster.

The control valve is thus preferably designed as a central valve for controlling a camshaft adjuster. It is therefore situated in a cavity of the camshaft and rotates with the latter. Camshaft adjusters in the form of a vane cell adjuster include as essential elements a stator and a rotor. The stator is rotatably fixedly connected to a drive wheel and is driven by the crankshaft via a traction mechanism drive. The rotor forms the output element. The rotor is situated concentrically with respect to the stator and is surrounded by the latter. Arranged in the circumferential direction in the stator is a recess which—without restricting the mobility between the rotor and the stator in the circumferential direction—is closed to form a pressure-tight cavity: laterally by a cover or by a side wall and on the inner diameter by the outer circumferential wall of the rotor. Engaging in the cavity is a vane which is fixedly connected to the rotor and which divides the cavity into two chambers A and B that may be closed in a pressure-tight manner. By connecting pressure chambers A and B in a targeted manner either to the inflow connection P or the outflow connection T, a pressure difference may be generated, as a result of which a force acts on the vane. The vane is thus displaced in the circumferential direction together with the rotor.

The displacement of the rotor results in a change in the phase position of the camshaft in relation to the phase position of the crankshaft. If the camshaft rotates in the clockwise direction and if pressure chamber B is ahead of pressure chamber A, adjusting the vane in the direction of pressure chamber B effectuates an adjustment of the opening and closing times to an earlier point in time.

BRIEF DESCRIPTION OF THE DRAWINGS

The invention will now be explained in greater detail on the basis of an exemplary embodiment, reference being made to the drawings. Functionally identical elements of the explained embodiments will be denoted by the same reference numerals.

FIG. 2 shows a check valve formed of a spring band with overlapping ends that is wound to form a cylindrical valve spring;

FIG. 3 shows the check valve of FIG. 2 in an unwound state.

DETAILED DESCRIPTION

Figure 1:
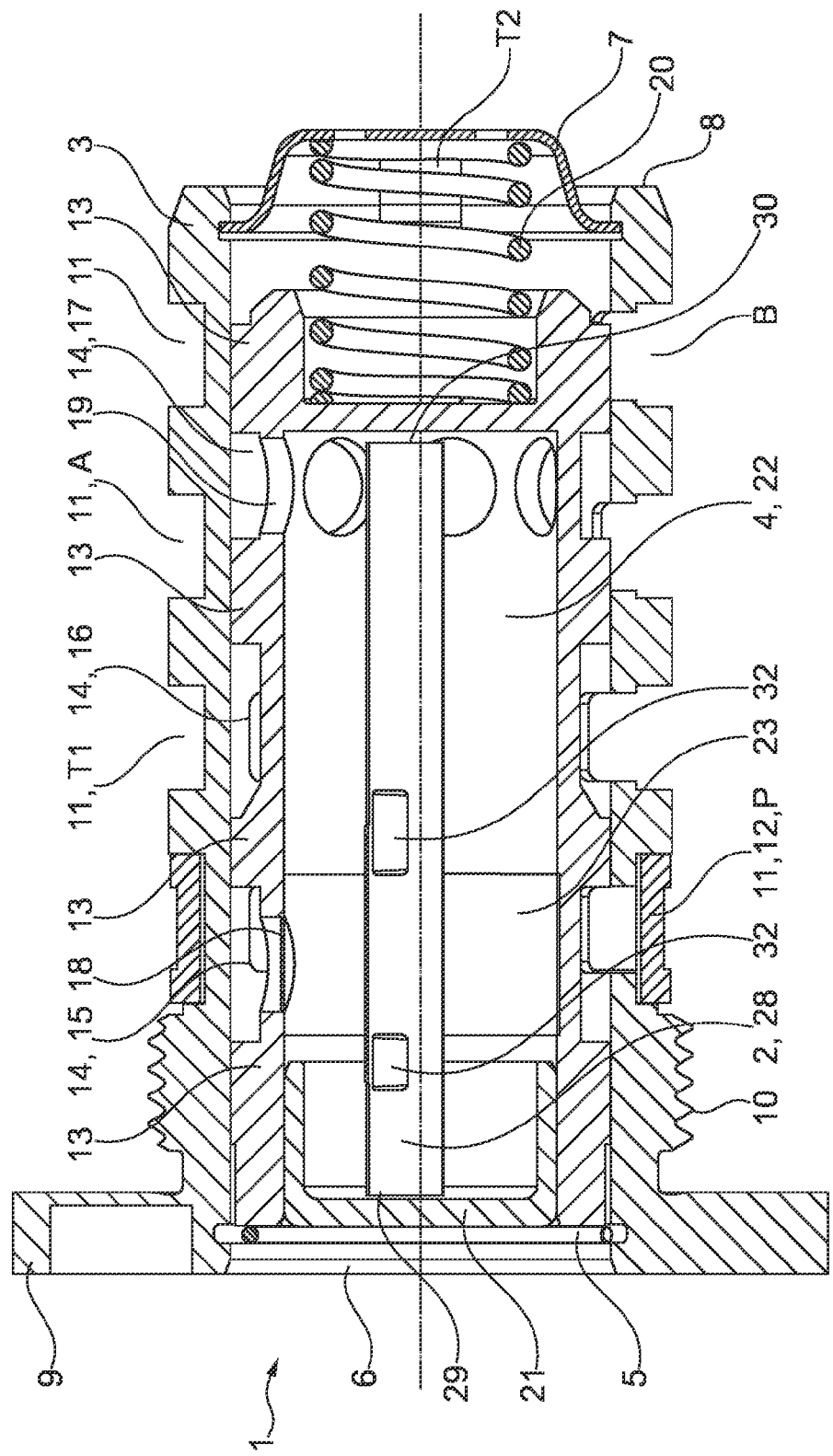
FIG. 1 shows an exemplary embodiment of a control valve piston including a check valve in longitudinal section.

FIG. 1 shows an exemplary embodiment of a control valve 1 including a check valve 2 in longitudinal section. Control valve 1 is formed of a valve housing 3 and a hollow cylindrical control piston 4 which is guided axially movably in a corresponding cavity of the valve housing. The adjustment range of control piston 4 is limited in the axial direction, by a retaining ring 5 at first end 6 and by a closure element 7 at second end 8. Valve housing 3 may be accommodated by a cavity of a camshaft and may serve for controlling a camshaft adjuster. A flange 9 serves together with an external thread 10 to connect control valve 1 to the camshaft. Valve housing 3 has on its outer circumference four annular grooves 11 which are spaced apart from one another in the axial direction and at the groove bottom of which openings are situated. The openings form, as inflow opening 33, inflow connection P, first outflow connection T1 as well as first supply connection A and second supply connection B. A further outflow connection T2 is located at second end 8 of the valve housing. A filter 12 is situated in the area of the opening that forms inflow connection P.

On its outer lateral surface, control piston 4 has four sections of widened diameter 13 which enclose three sections of reduced diameter 14. Together with the inner lateral surface of the valve housing, these form a first, a second and a third circumferential annular channel 15, 16, 17. For controlling a camshaft adjuster, control piston 4 may assume different switching positions which are characterized by the actual course of possible pressure medium paths. The implementation of a switching position takes place with the aid of an actuator, which is usually an electromagnetically operated actuator.

A push rod connected to an armature of the electromagnet is brought into contact with an actuation surface on the end side of the control piston. The force acting on the armature is thus transmitted via the push rod to the control piston and thus effectuates the axial displacement of the latter counter to the force of a spring 20. In this way, the first annular channel may be brought into connection with inflow connection P, and the second annular channel may be brought into connection with outflow connection T1. The third annular channel may be brought into connection with first supply connection A, with second supply connection B, with both or with neither.

Provided at the groove bottom of the groove forming first annular channel 15 is a first through-opening 18, and provided at the groove bottom of the groove forming third annular channel 17 is a second through-opening 19. Apart from first and second through-opening 18, 19, control piston 4 is closed on the side facing away from the spring by a pressure piece 21. Pressure medium may thus be conducted via inflow connection P into piston cavity 22 and from there to supply connections A, B. Supply connection A may be brought into connection with outflow connection T1 via second annular channel 16, and supply connection B may be brought into connection with outflow connection T2.

Situated within piston cavity 22 is a check valve 2 which is formed of a spring band 23 with overlapping ends that is wound to form a cylindrical valve spring. An inner and an outer end 24, 2 and an inner and outer surface 26, 27 of spring band 23 are defined by the winding of spring band 23, whereby spring band 23, at its inner end 24, merges into an axially extending spacer element 28, axial ends 29, 30 of which may be brought into contact with the inner side of the end surfaces of the control piston. The spacer element is formed by a tongue-like channel 31 which has a curved profile in cross-section.

The axial position of spring band 23 within piston cavity 22 is set in such a way that outer surface 27 of the spring band in the area of first through-opening 18 may be brought to rest against the inner lateral surface of control piston 4. In this way, first through-opening 18 may be closed. In the inflow direction, first through-opening 18 is unblocked so that pressure medium may enter piston cavity 22; however, check valve 2 blocks in the opposite direction. Pressure peaks are not relayed into the area of the inflow line.

Check valve 2 may be manually inserted into piston cavity 22 of control piston 4 with the aid of a slight rotation in the circumferential direction. After installation, piston cavity 22 is closed by the pressure piece, as a result of which an axial stop is provided for spacer element 28 of the check valve. Spacer element 28 has a uniform surface which is interrupted in an axial section of the spacer element on inner side 26 of the spring band by exposed material sections 32. The uniform surface of spacer element 28 is interrupted by way of an elevation on each of two spaced-apart axial sections on inner side 26 of spring band 23, whereby the elevations join the axial area in which spring band 23 forms the cylindrical valve spring. In this way, two spring bands 23 wound to form a cylindrical valve spring are prevented from becoming threaded together prior to their insertion into control piston 4.

FIG. 2 shows check valve 2 which is formed of a spring band 23 with overlapping ends that is wound to form a cylindrical valve spring. An inner end 24 and an outer end 25 as well as an inner and outer surface 26, 27 of the spring band are defined by the winding of the spring band, whereby the spring band, at its inner end 24, merges into an axially extending spacer element 28, whose axial ends 29, 30 may be brought into contact with the inner side of the end surfaces of the control piston. Spacer element 28 is formed by a tongue-like channel which has a curved profile in cross-section. Spacer element 28 has a uniform surface which is interrupted in an axial section of the spacer element on the inner side of spring band 23 by exposed material sections 32. The uniform surface of spacer element 28 is interrupted by an elevation 32 on each of two spaced-apart axial sections on inner surface 26 of the spring band, whereby the elevations join the axial area in which spring band 23 forms the cylindrical valve spring. Spacer element 28 extends along the axis of rotation of the spring band that is wound to form a cylindrical valve spring. FIG. 3 shows spring band 23 in an unwound state.

LIST OF REFERENCE NUMERALS 1 control valve
2 check valve
3 valve housing
4 control piston
5 retaining ring
6 first end
7 closure element
8 second end
9 flange
10 external thread
11 annular groove
12 filter
13 widened diameter
14 reduced diameter
15 first annular channel
16 second annular channel
17 third annular channel
18 first through-opening, through-opening
19 second through-opening
20 spring
21 pressure piece
22 piston cavity
23 spring band
24 inner end
25 outer end
26 inner surface
27 outer surface
28 spacer element
29 axial end
30 axial end
31 tongue-like channel
32 elevation, exposed material section
33 inflow opening
A supply connection A
B supply connection B
P inflow connection
T1 first outflow connection
T2 second outflow connection

What is claimed is:

1. A control valve for a camshaft adjuster comprising:
   a valve housing having an inflow opening;
   a control piston guided axially movably in a receptacle of the valve housing, the control piston having a first control edge and a second control edge, the first control edge and the second control edge enclosing a groove, the groove configured for being brought into connection with the inflow opening, the groove being connected via a through-opening at a bottom of the groove to a cylindrical piston cavity, the cylindrical piston cavity being closed at an end thereof; and
   a check valve situated within the cylindrical piston cavity, the check valve being formed of a spring band with overlapping ends, the spring band being wound to form a cylindrical valve spring defining a radially inner end, a radially outer end, an inner surface and an outer surface of the spring band, the spring band at the radially inner end merging into an axially extending spacer element, the axially extending spacer element including axial ends configured to be brought into contact with an inner side of end surfaces of the control piston, the axial ends configured for setting an axial position of the spring band within the cylindrical piston cavity in such a way that the outer surface of the spring band, in an area of the through-opening, is brought to rest against an inner lateral surface of the control piston to close the through-opening, the axially extending spacer element having a uniform surface which is interrupted in an axial section of the axially extending spacer element by an elevation.

2. The control valve as recited in claim 1 wherein the uniform surface of the axially extending spacer element is interrupted on two spaced-apart axial sections of the axially extending spacer element on the inner surface of the spring band by the elevation in such a way that a threading-together of two spring bands wound to form a cylindrical valve spring prior to their insertion into the control piston is prevented.

3. The control valve as recited in claim 2 wherein the two spaced-apart axial sections join an axial area in which the spring band forms the cylindrical valve spring.

4. The control valve as recited in claim 3 wherein the elevation is formed by an exposed material section.

5. The control valve as recited in claim 1 wherein the axially extending spacer element is formed by a tongue-like channel.

6. The control valve as recited in claim 5 wherein the tongue-like channel has a curved profile in cross-section.

7. The control valve as recited in claim 1 wherein the axially extending spacer element extends along an axis of rotation of the spring band that is wound to form the cylindrical valve spring.

8. The control valve as recited in claim 1 wherein the through-opening forms a first through-opening which enables the inflow of pressure medium into the cylindrical piston cavity, the control piston including a second through-opening enabling the outflow of pressure medium from the cylindrical piston cavity that is located at the end of the control piston situated opposite the first through-opening.

9. The control valve as recited in claim 1 wherein at least one end side of the control piston is closed by a pressed-in pressure piece.

10. A camshaft adjusting device comprising:
a camshaft adjuster; and
the control valve as recited in claim 1, the control valve configured for being arranged as a central valve in a receptacle of a camshaft and having an inflow and an outflow connection and two supply connections, the two supply connections configured for each being fluidly connected to a pressure chamber of the camshaft adjuster.

* * * * *